United States Patent
Hayami

(10) Patent No.: US 10,545,704 B2
(45) Date of Patent: Jan. 28, 2020

(54) IMAGE FORMING APPARATUS AND CONTROL METHOD TO UPDATE AN APPLICATION IN AN IMAGE FORMING APPARATUS

(71) Applicant: CANON KABUSHIKI KAISHA, Tokyo (JP)

(72) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/143,291

(22) Filed: Sep. 26, 2018

(65) Prior Publication Data

US 2019/0102121 A1    Apr. 4, 2019

(30) Foreign Application Priority Data

Sep. 29, 2017    (JP) ................................ 2017-191762

(51) Int. Cl.
  *G06F 3/12*    (2006.01)
  *G06F 9/445*    (2018.01)
  *G06F 21/62*    (2013.01)

(52) U.S. Cl.
  CPC .......... *G06F 3/1222* (2013.01); *G06F 3/1225* (2013.01); *G06F 3/1286* (2013.01); *G06F 9/44526* (2013.01); *G06F 21/629* (2013.01)

(58) Field of Classification Search
  None
  See application file for complete search history.

(56) References Cited

U.S. PATENT DOCUMENTS

| 9,563,416 B2 | 2/2017 | Dokai |
| 9,742,948 B2 | 8/2017 | Hayami |
| 2016/0188310 A1 | 6/2016 | Hayami |
| 2016/0360058 A1* | 12/2016 | Hayami ............. H04N 1/00938 |
| 2017/0076099 A1* | 3/2017 | Yao .......................... G06F 21/62 |

OTHER PUBLICATIONS

OSGi Service Platform, Release 4; https://www.osgi.org/developer/downloads/, Aug. 2005.

* cited by examiner

*Primary Examiner* — Lennin R Rodriguezgonzalez
(74) *Attorney, Agent, or Firm* — Canon U.S.A., Inc. IP Division

(57) ABSTRACT

A permission list for a host application associated with the host application is held, and a plug-in application is added to the host application a permission included in the plug-in application is added and updated to the permission list for the host application, and whether processing in the host application and the plug-in application is to be executed is determined based on the updated permission list.

12 Claims, 17 Drawing Sheets

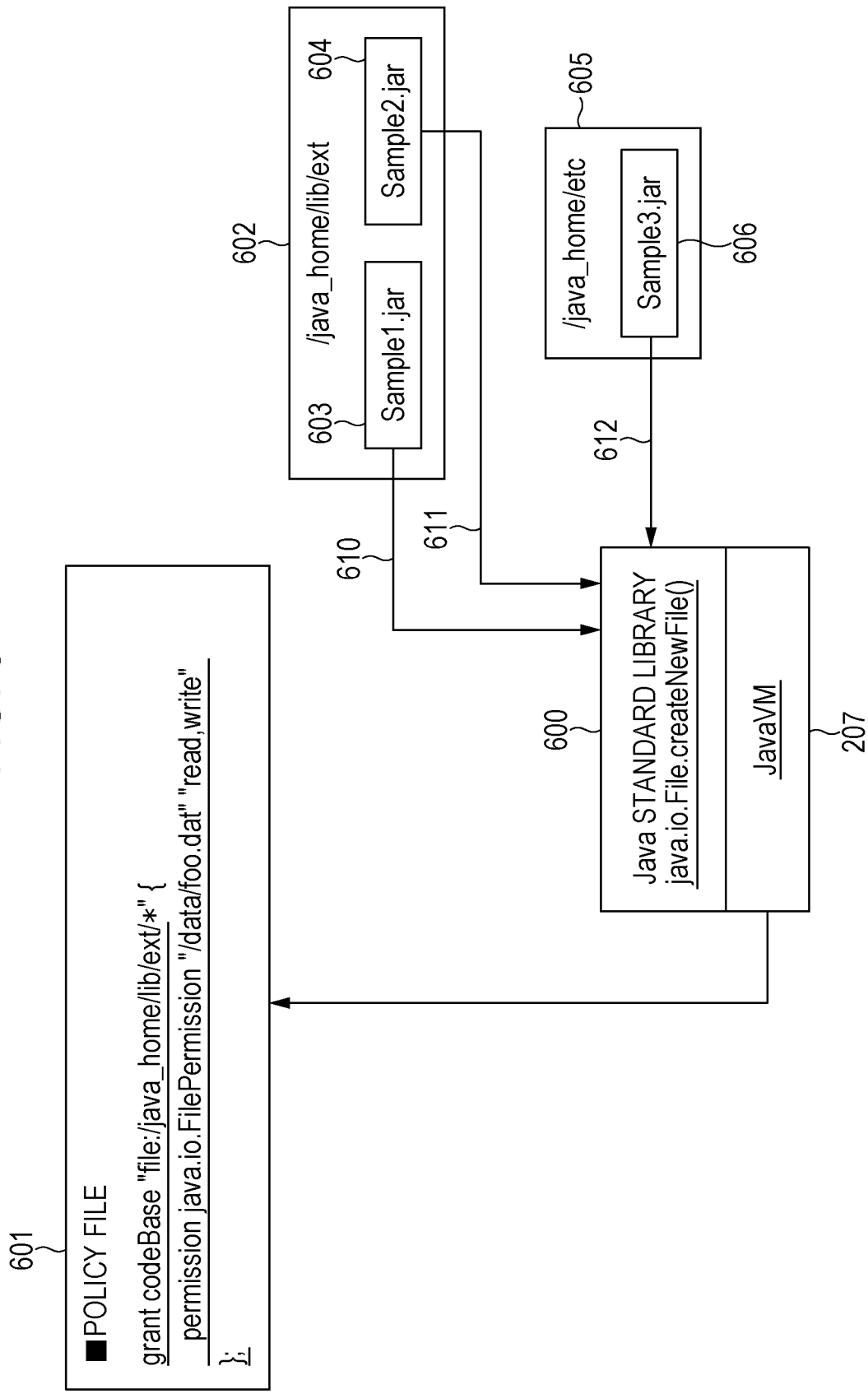

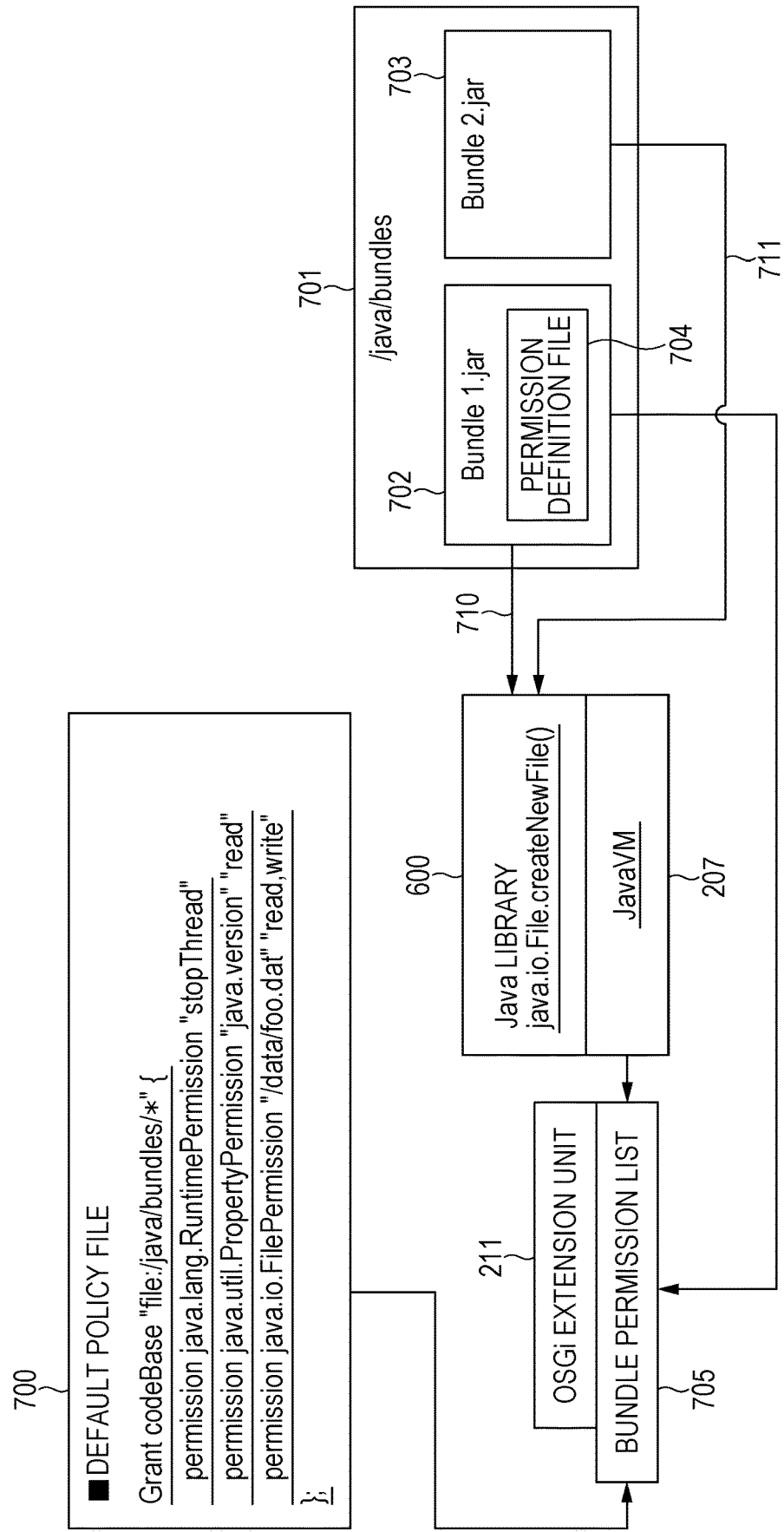

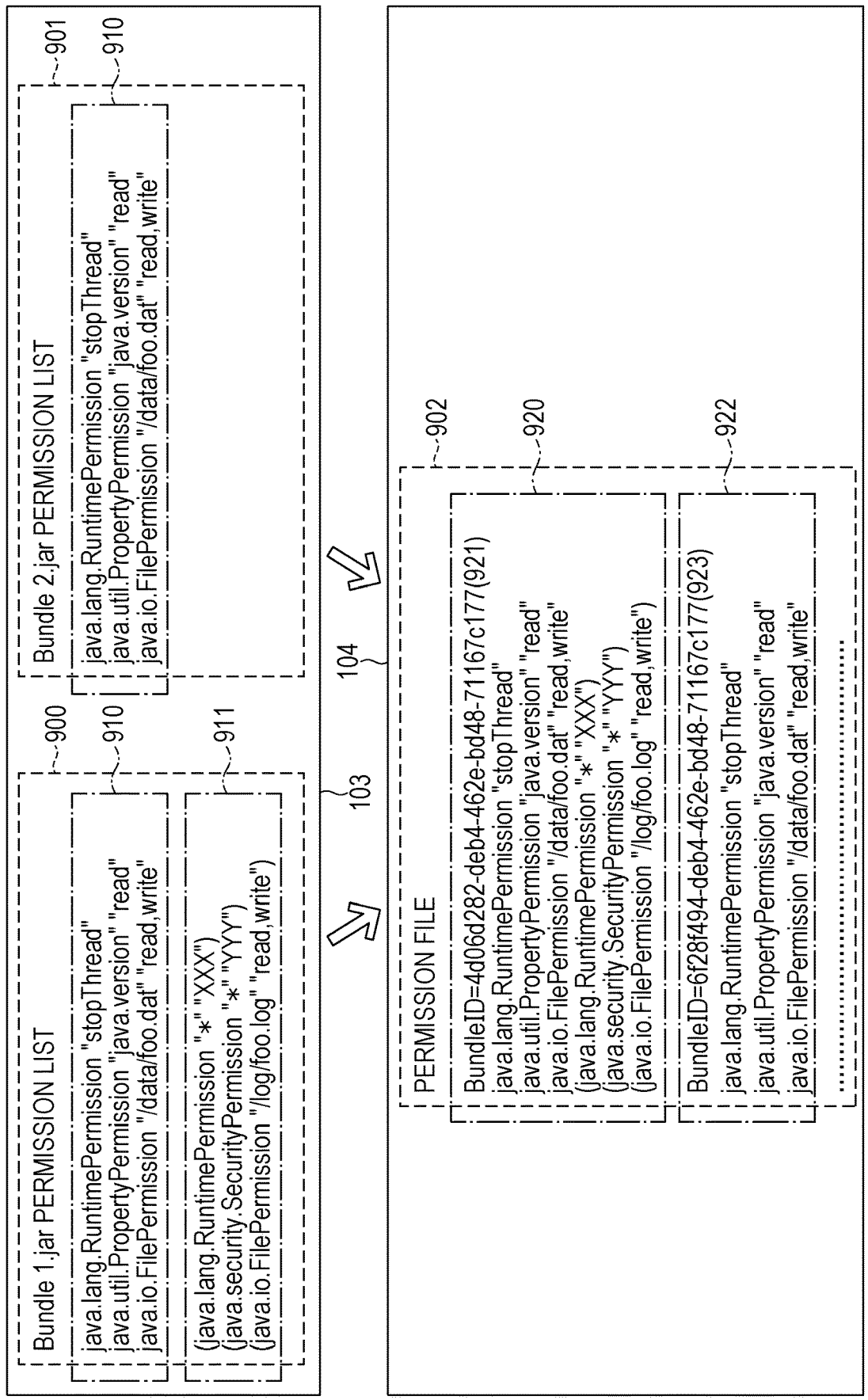

FIG. 14

1400
BUNDLE PERMISSION LIST
(java.lang.RuntimePermission "stopThread")
(java.util.PropertyPermission "java.version" "read")
(java.io.FilePermission "/data/foo.dat" "read,write")
(org.osgi.framework.BundlePermission "4d06d282-deb4-462e-bd48-71167c177" "HOST")

1401
BUNDLE PERMISSION LIST
(java.lang.RuntimePermission "stopThread")
(java.util.PropertyPermission "java.version" "read")
(java.io.FilePermission "/data/foo.dat" "read,write")
(org.osgi.framework.BundlePermission "4d06d282-deb4-462e-bd48-71167c177" "HOST")
*(org.osgi.framework.BundlePermission "4d06d282-deb4-462e-bd48-71167c177" "FRAGMENT")*
*(java.io.FilePermission "/log/foo1.log" "read,wrte")*
*(java.io.FilePermission "/log/foo2.log" "read,wrte")*
1410

1402
PERMISSION FILE
BundleID=4d06d282-deb4-462e-bd48-71167c177(1421)
(java.lang.RuntimePermission "stopThread")
(java.util.PropertyPermission "java.version" "read")
(java.io.FilePermission "/data/foo.dat" "read,write")
(org.osgi.framework.BundlePermission "4d06d282-deb4-462e-bd48-71167c177" "HOST")
*(org.osgi.framework.BundlePermission "4d06d282-deb4-462e-bd48-71167c177" "FRAGMENT")*
*(java.io.FilePermission "/log/foo1.log" "read,wrte")*
*(java.io.FilePermission "/log/foo2.log" "read,wrte")*
..................................
1420

IMAGE FORMING APPARATUS AND CONTROL METHOD TO UPDATE AN APPLICATION IN AN IMAGE FORMING APPARATUS

BACKGROUND

Field of the Disclosure

The present disclosure relates to management of application programs.

Description of the Related Art

In recent years, for image forming apparatuses, an application program (hereinafter, "app") operating environment such as JAVA (registered trademark, omitted below) environment is provided. A technology has been proposed which provides an extendable app by applying program portability of JAVA. For improved functionality and usability of image forming apparatuses, an app which operates in an environment such as a JAVA environment may be generated and be installed in an image forming apparatus so that the app can provide a desired function.

As an app platform, a JAVA app platform for an integrated apparatus is provided such as OSGi (Open Services Gateway Initiative) Service Platform (hereinafter, OSGi) (see "OSGi Service Platform, Release 4", https://www.osgi.org/developer/downloads/, August 2005). OSGi has specifications including mechanisms called a host bundle and a fragment bundle. The host bundle is a bundle to which a fragment bundle is to be added. The fragment bundle is a bundle which does not operate alone but adds (attaches) a bundle to a class loader space of a host bundle.

Each of bundles including such a fragment bundle has a security access authorization mechanism called a permission provided in JAVA standard specifications. The permission can be defined individually for each bundle.

A permission for a permission definition file held by a host bundle may be kept at a necessary minimum security. On the other hand, a permission for processing a fragment bundle may be processed according to a permission for a host bundle. This may possibly result in insufficient permissions for processing the fragment bundle. When permissions for processing a fragment bundle are insufficient, the permission definition file held in the host bundle is to be corrected every time, losing convenience of the fragment bundle.

SUMMARY

An aspect of the present disclosure provides a technology providing a fragment bundle executable without correcting a permission definition file held in a host bundle and without lacking permissions for processing the fragment bundle.

An image forming apparatus according to an aspect of the present disclosure includes a holding unit configured to hold a permission list for a host application associated with the host application, an addition unit configured to add a plug-in application to the host application, an update unit configured to add and update a permission included in the plug-in application to the permission list for the host application, and a determination unit configured to determine whether processing in the host application and the plug-in application is to be executed based on the updated permission list.

Further features of the present disclosure will become apparent from the following description of exemplary embodiments with reference to the attached drawings.

BRIEF DESCRIPTION OF THE DRAWINGS

FIG. 6 illustrates a mechanism of a permission in general JAVA.

FIG. 7 illustrates a mechanism for a permission in OSGi.

FIG. 9 illustrates a permission list and a permission file held on a memory by an OSGi extension unit.

FIG. 14 illustrates changes of a permission list held in a host bundle when a fragment bundle is attached thereto.

DESCRIPTION OF THE EMBODIMENTS

Best modes for embodying the present disclosure will be described with reference to drawings.

First of all, permission processing in an OSGi extension unit will be described in a case where a fragment bundle is attached (added) to a host bundle. It should be noted that the term "host bundle" is a synonym for "host application (host app)", and the term "fragment bundle" is a synonym for "plug-in application (plug-in app)".

Figure 1:
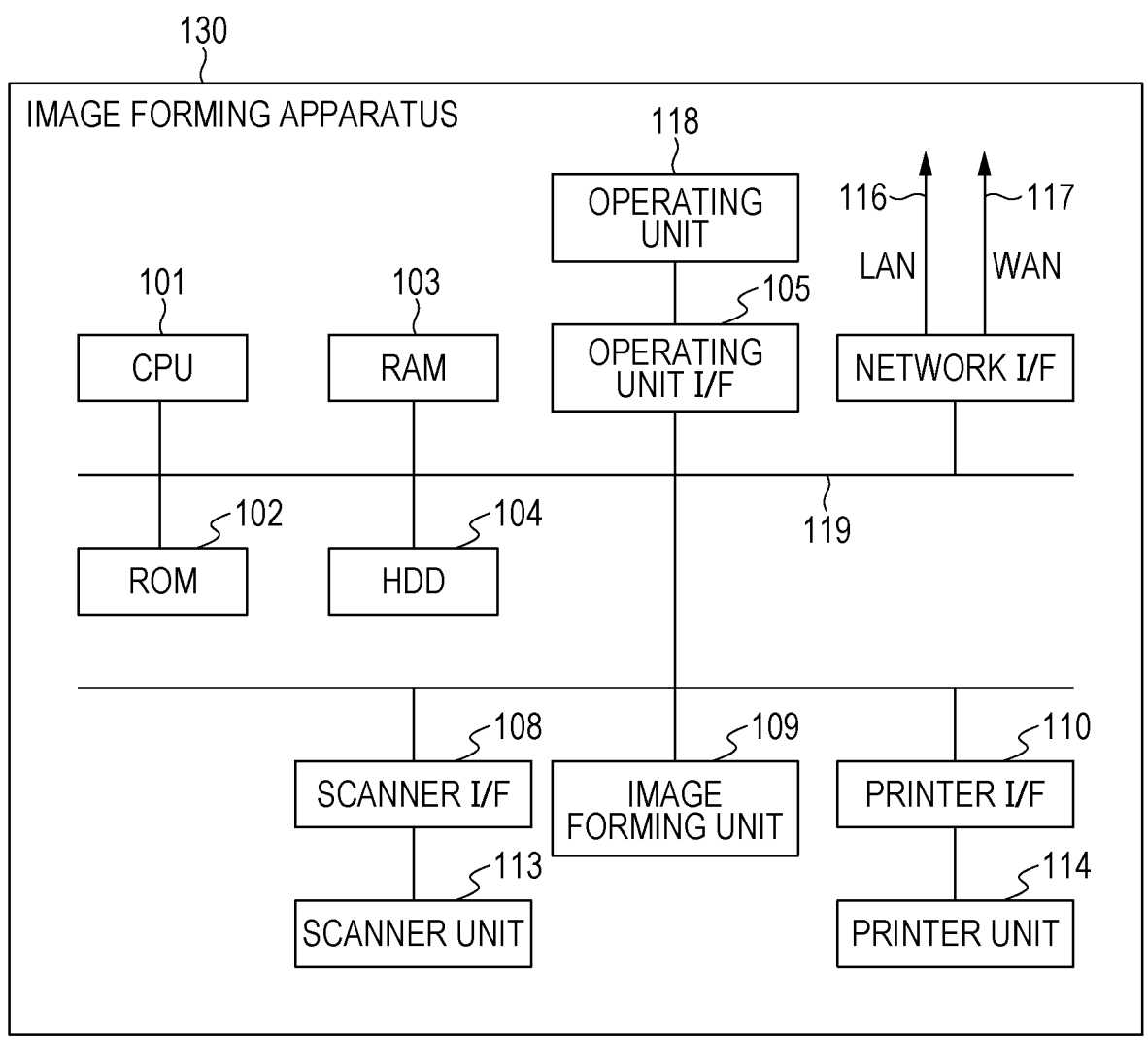
FIG. 1 is a hardware configuration diagram illustrating an image forming apparatus.

FIG. 1 is a hardware configuration diagram illustrating an image forming apparatus 130 including a print function, a scan function, and a network communication function.

The image forming apparatus 130 is electrically connected to a scanner unit 113 and a printer unit 114 and, on the other hand, to an external device over a LAN 116. A CPU 101 is configured to generally control accesses to hardware modules connected to the image forming apparatus based on a control program stored in a ROM 102 and also to generally control processes within the controller.

The ROM 102 is a read-only nonvolatile storage area and is configured to store a boot program and firmware for the image forming apparatus 130. A RAM 103 is a system work memory to be used by the CPU 101 for operating and is configured to temporarily store various kinds of data. The RAM 103 may include an FRAM (registered trademark) or an SRAM which can hold data stored therein after powered off and a DRAM in which data stored therein are deleted after powered off.

Figure 3:
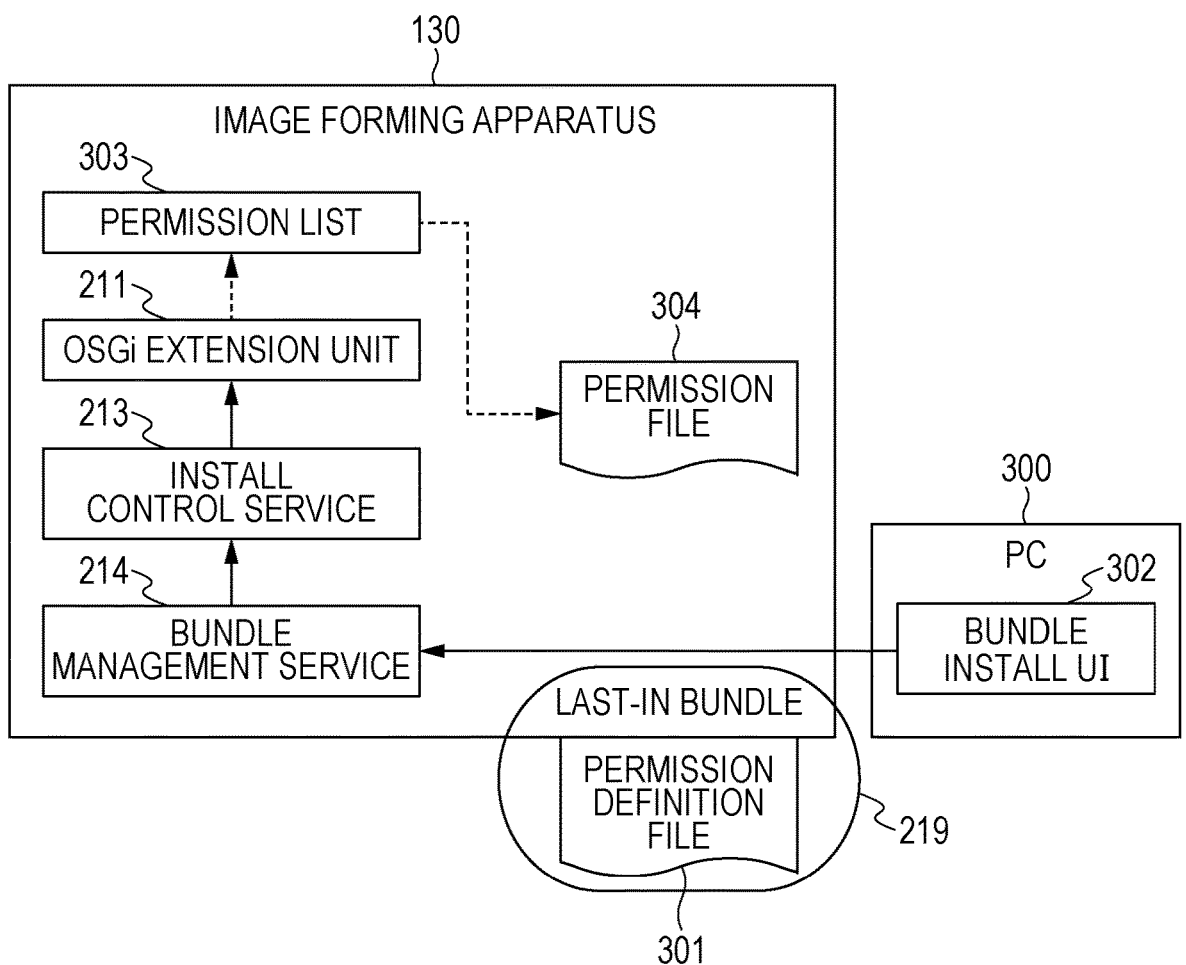
FIG. 3 is a block diagram illustrating a flow for installing a bundle.

An HDD 104 is a nonvolatile storage area and is configured to store a system bundle. Firmware including a bundle to be installed, which will be described with reference to FIG. 3, is stored in the HDD 104. An operation unit I/F 105 is an interface unit configured to connect a system bus 119 and an operating unit 118. More specifically, the operation unit I/F 105 may receive data to be displayed on the operating unit 118 from the system bus 119 and may output input information from the operating unit 118 to the system bus 119. A user instruction and information may be presented to the information image forming apparatus 130 through the operating unit 118. A network I/F 106 is configured to connect a LAN 116, a WAN 117 and the system bus 119 and is usable for input/output of information to/from an external apparatus.

A scanner I/F 108 is configured to correct, process and edit image data received from the scanner unit 113. An image forming unit 109 is configured to perform orientation conversion, image compression, and decompression on image data. A printer I/F 110 is configured to receive image data transmitted from the image forming unit 109, perform image forming therefrom and print it in the printer unit 114.

Figure 2:
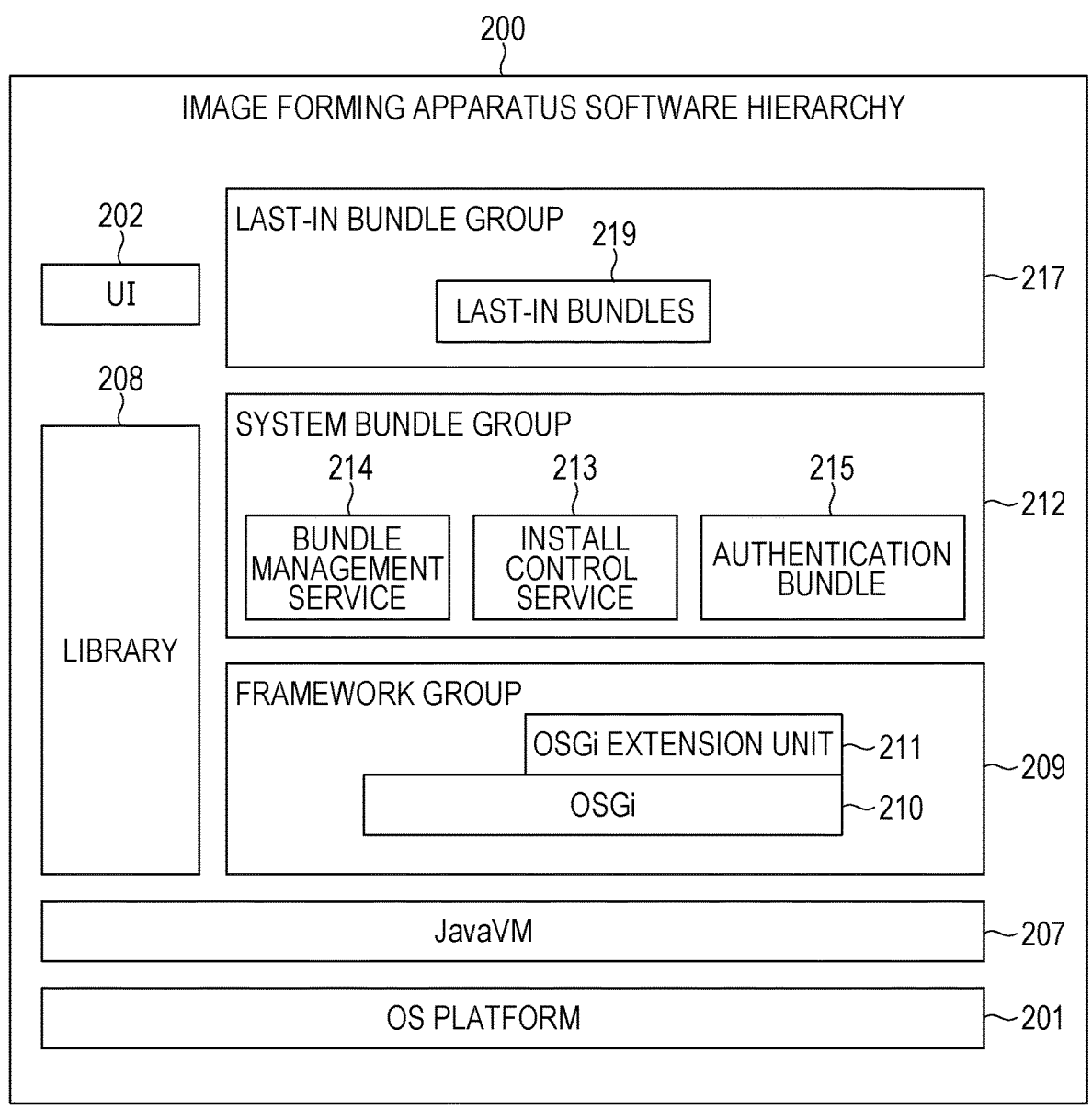
FIG. 2 is a software module hierarchy diagram illustrating the image forming apparatus.

FIG. 2 illustrates a software module hierarchy 200 of the image forming apparatus 130 according to the present disclosure.

The software illustrated in FIG. 2 and subsequent figures may be stored in the ROM 102 or the HDD 104 and may be executed by the CPU 101. Information to be used for the execution may be held in the RAM 103 or the HDD 104 and be exchanged between software functions. The network I/F 106 may be used for communication with an external apparatus.

Next, software modules will be described below. First of all, the software has an operating system (OS) platform 201. A user interface 202 is a user interface module configured to mediate between the image forming apparatus 130 and a user operation when an operator operates and defines on the image forming apparatus 130, The module is configured to transfer input information to a module in accordance with an operation by an operator and to request processing or change settings of data.

Next, a JAVA side configuration will be described.

A JAVA side software platform is configured as a runtime environment for a Java VM 207 and includes the Java VM 207 being an interpreter, a library 208, and a framework group 209, The library 208 includes a default API library. The framework group 209 includes an OSGi 210, and the OSGi 210 causes the single Java VM 207 to operate a plurality of bundles.

OSGi defines a bundle as a management unit for a software module and defines specifications for managing a life cycle including install/start/stop/update/uninstall. Here, the term "bundle" refers to a JAVA module and is a synonym for "app" according to the present disclosure. Therefore, an app will be notated as a bundle hereinafter. On such an app platform, integrated functions such as copy, scan, and print can be provided by bundles.

An OSGi extension unit 211 is a module responsible or implemented part to the OSGi 210 that is interface specifications. The OSGi extension unit 211 defines whether a function can be extended as required within a scope satisfying the specifications of the OSGi 210. The OSGi 210 and the OSGi extension unit 211 can provide a function for managing a life cycle of a bundle and a communication function between bundles.

The OSGi 210 has a group of a plurality of system bundles 212 thereon. The system bundle group 212 may include a bundle management service 214 configured to manage a plurality of bundles and to add, update, or delete a new bundle. The bundle management service 214 is a reception for an install instruction from a PC. The bundle management service 214 having received an install instruction uses an install control service 213 to add or update a bundle.

The system bundle group 212 includes an authentication bundle 215 responsible for an authentication function for the image forming apparatus 130. The authentication bundle 215 is a bundle which cannot be deactivated because it is to answer to an inquiry about authentication information at an arbitrary time from an arbitrary bundle while a user is being authenticated by an image forming apparatus.

On the other hand, a last-in bundle group 217 is provided that is to be installed afterwards. The bundle installation will be described with reference to FIG. 3. The last-in bundle group 217 includes a last-in bundle 219 and is configured to provide a process to a user in the image forming apparatus 130. For example, the last-in bundle 219 may be a bundle configured to perform image processing or compression and to perform department management relating to print restriction, for example. The last-in bundle 219 configured to implement a function operates under management of a bundle management service 214. The bundle management service 214 is configured to hold bundle information, license information including a version of a bundle added under the management.

FIG. 3 is a block diagram illustrating a flow for installing the last-in bundle 219 from a PC 300 to the image forming apparatus 130 by a user.

The commercially available last-in bundle 219 is provided with a digital signature and is encrypted for prevention of tampering. The last-in bundle 219 holds a permission definition file 301. The permission definition file 301 is a permission usable for using various functions after the last-in bundle 219 is installed. Here, the term "permission" refers to a security access authorization mechanism provided in JAVA standard specifications. The permission definition file 301 may not be held if not necessary. The permission may typically be defined in a format including a permission name and "name" and "action", which will be described below. The "name" and "action" can have values depending on the type of permission. "*" may be designated to enable designation of a wild card.

(XXXPermission, "name", "action")

A bundle install user interface 302 may be displayed on a WEB browser of the PC 300, and the last-in bundle 219 to be installed may be designated and installed from the bundle install user interface 302. The bundle management service 214 having received the bundle designated through the bundle install user interface 302 is passed to an install control service 213. The install control service 213 having received the bundle file performs decryption processing on the received last-in bundle 219 and checking processing for determining whether the bundle has a digital signature indicating validity. If the checking processing succeeds, the install control service 213 finally requests the OSGi extension unit 211 to install the bundle. The OSGi extension unit 211 is configured to generate a permission list 303 on memory for each bundle so that permission management of the bundle can be implemented when the bundle is installed.

This is generated for answering to an inquiry from the Java VM 207 about a permission held by the bundle. The permission list 303 will be described in detail with reference to FIG. 7. Not only upon installation but also upon start-up of the image forming apparatus, permissions of all bundles included in the image forming apparatus are to be read back to the permission list 303. Accordingly, a permission file 304 including permission information on all bundles is generated. Such management over permissions is included in a protocol of the OSGi 210. The permission file 304 will be described in detail with reference to FIG. 9.

Figure 4:
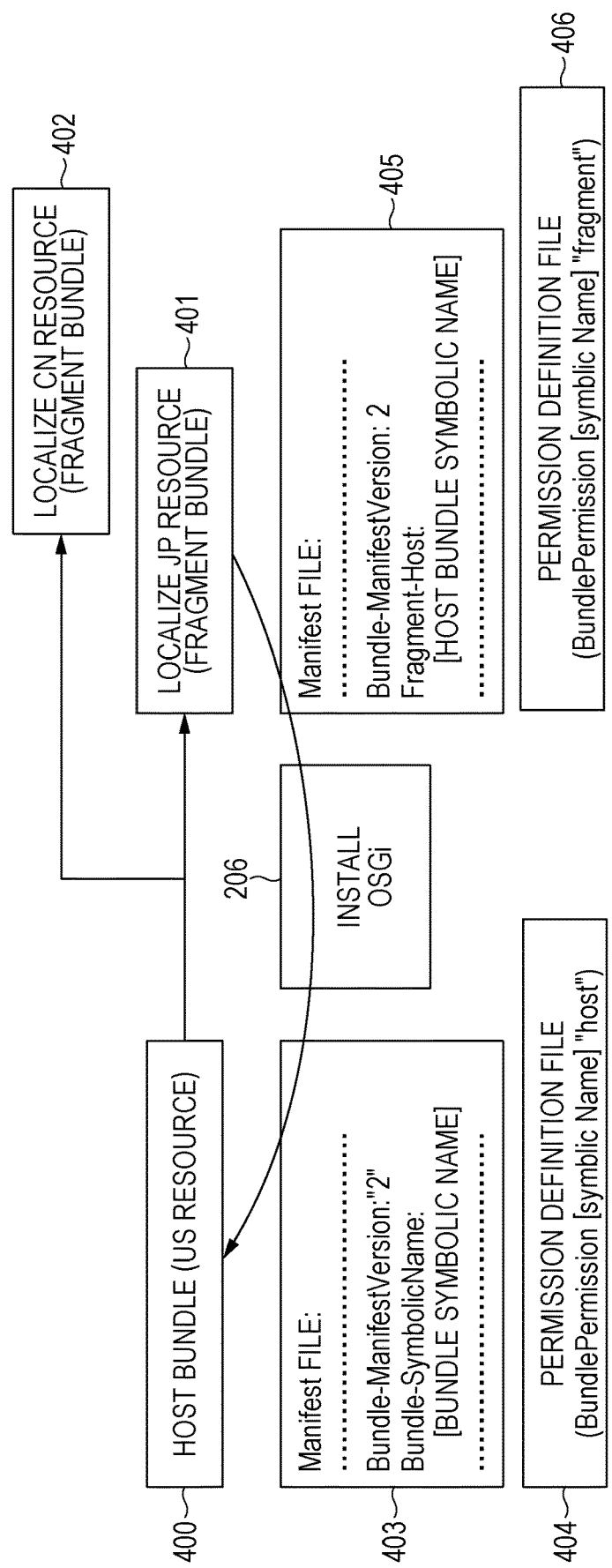
FIG. 4 is a conceptual diagram illustrating a fragment bundle.

FIG. 4 illustrates a concept of a fragment bundle.

FIG. 4 illustrates an example in which fragment bundles 401 and 402 having language localization resources are attached to a host bundle 400.

In order to attach a fragment bundle to a host bundle, a bundle permission is to be designated in the following manifest and permission definition file according to the protocol of the OSGi 210.

Manifest 403 of Host Bundle
"2" is designated for Bundle-ManifestVersion.
A unique name within a framework is given for Bundle-SymbolicName.
Manifest 105 of Fragment Bundle
"2" is designated for Bundle-ManifestVersion,
[HOST BUNDLE SYMBOLIC NAME] written in the manifest 403 of the host bundle is designated for Fragment-Host. A match of this value indicates that the host bundle and the fragment bundle are components of an identical bundle.
Permission 404 of Host Bundle
BundlePermission [BUNDLE SYMBOLIC NAME, HOST]
Permission 406 of Fragment Bundle
BundlePermission [BUNDLE SYMBOLIC NAME, FRAGMENT]

If these conditions are satisfied and when the fragment bundles are attached, the OSGi 210 identifies the host bundle from manifest information of the fragment bundles and adds class paths of the fragment bundles to the class path of the host bundle. Here, the "class path" designates a location from which the JAVAVM reads out a class file when a JAVA application is executed. A class loader of the host bundle loads all classes and a resource within the fragment bundle. Here, the term "class loader" refers to an object configured to load a class and to search a resource, and all classes are loaded by the class loader to the JAVAVM so that they can be used by the corresponding applications. Because the loading by the class loader of the host bundle is executed when the host bundle is activated, the host bundle is to be deactivated once, and the class paths are to be added before the loading.

According to this embodiment, fragment bundles mainly having the Japanese resource 401 and the Chinese resource 402 are installed in the host bundle 400. After that, the host bundle 400 can use the Japanese and Chinese resources to change the resource language. In other words, the user interface of the host bundle displays in English, but the resource change may be designated on the user interface of the host bundle to generate the host bundle in Japanese display or Chinese display.

In general, according to the OSGi protocol, a fragment bundle follows a designation of a permission of the host bundle. In other words, a function invoked from a fragment bundle is to be processed by following the permission of the host bundle. According to the OSGi protocol, the permission of the host bundle does not change upon switch between attachment and detachment.

When an app is corrected or is extended, a fragment bundle can be used to correct or extend a function of the host bundle so that a file having a smaller size can be installed for efficient module distribution.

Figure 5:
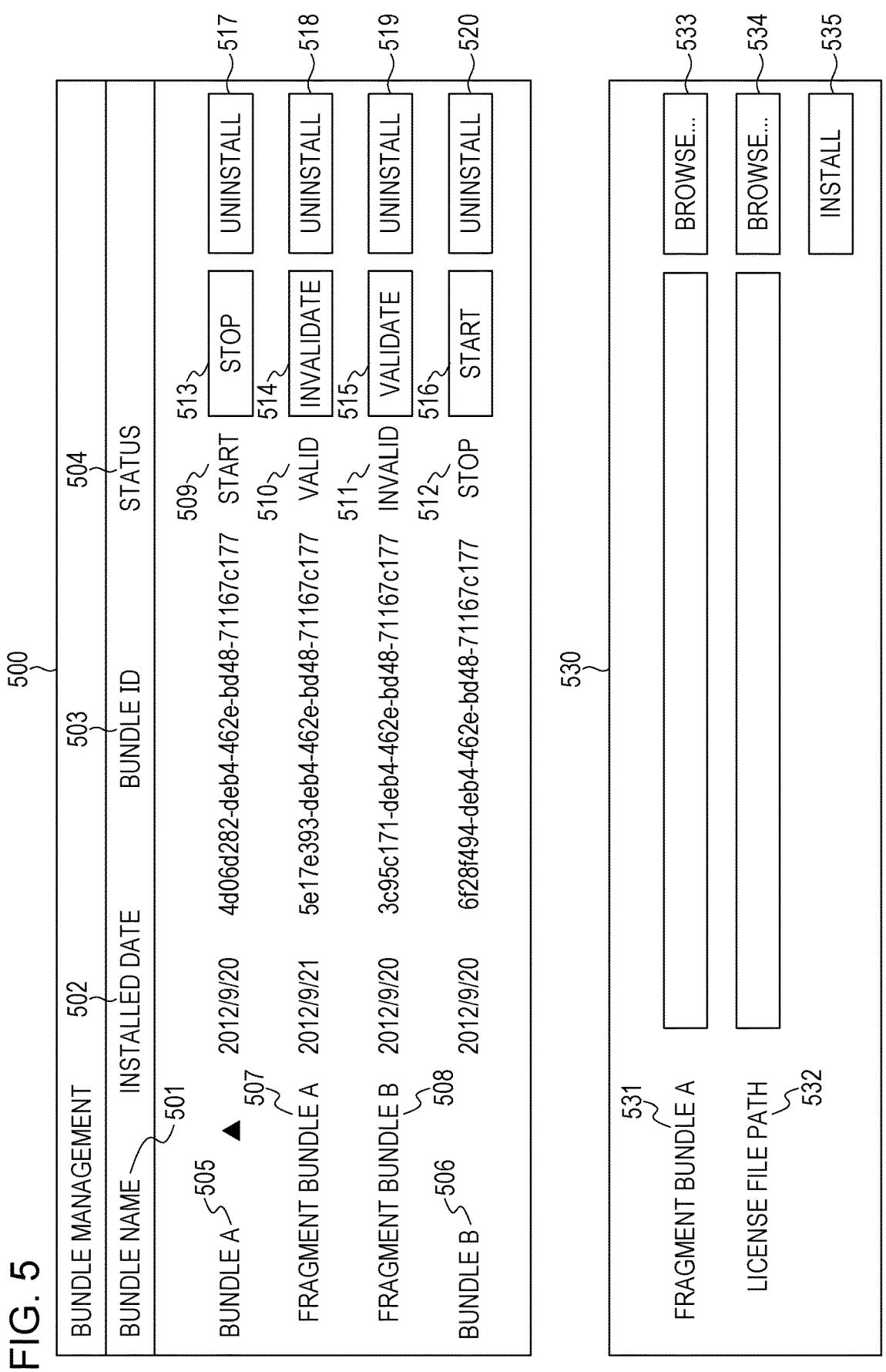
FIG. 5 illustrates user interfaces on a bundle management screen and an installation screen.

FIG. 5 illustrates a bundle management screen 500 and an installation screen 530 in the bundle management service 214.

First of all, the bundle management screen 500 will be described.

A bundle name 501 displays a bundle name under management. In this example, two of BUNDLE A 505 and BUNDLE B 506 are managed. The BUNDLE A is defined as a host bundle, and a FRAGMENT BUNDLE A 507 and a FRAGMENT BUNDLE B 508 are managed. In this case, for clear presentation of association (correspondence) of the host bundle and fragment bundles, the FRAGMENT BUNDLE A 507 and the FRAGMENT BUNDLE B 508 are displayed in association with the BUNDLE A 505. An installed date 502 is a date when a bundle is installed. A bundle ID 503 displays a bundle ID uniquely assigned to a bundle. The bundle ID is identification information for identifying a bundle. A status 504 displays a status of a bundle. "START" is displayed if a bundle is started, and "STOP" is displayed if the bundle is stopped. When a fragment bundle is attached to a host bundle, "VALID" is displayed. The status that a fragment bundle is attached is called a valid status. When a fragment bundle is not attached, that is, is detached. "INVALID" is displayed. The status in which a fragment bundle is detached is called an invalid status. In the invalid status, the fragment bundle is not associated with the host bundle, but its entity in jar remains on the HDD 104. Thus, the invalid status can shift to the valid state, if any, in jar without designating it. The START button 516/STOP button 513 is an instruction button (reception button) for switching between start and stop of a bundle. If a bundle has a start status, the STOP button is displayed while a bundle has a stop status, the START button is displayed. A VALIDATE button 515/INVALIDATE button 514 is an instruction button for switching between the valid status and the invalidate status of a fragment bundle. When the INVALIDATE button 514 is pressed for a bundle ("FRAGMENT BUNDLE A 507" in this example) having the valid status, the status 504 is changed to the INVALID status. On the other hand, when the VALIDATE button 515 for an invalid status bundle ("FRAGMENT BUNDLE B 508" in this example) is pressed, the status 504 is changed to VALID status. UNINSTALL buttons 517 to 520 are instruction buttons for uninstalling a bundle. When the uninstalling is instructed, the entity in jar remaining on the HDD 104 is deleted.

Next, the installation screen 530 will be described, A BROWSE button 533 may be used to display a screen for selecting a file path. When a bundle file is designated on the screen, a path to the bundle file is input to a path 531 to the bundle file. A bundle is encrypted from a security or business viewpoint, and the bundle is to be decrypted for installation processing. Accordingly, a license file holding a key therefor may be required. In this case, when the BROWSE button 534 is pressed, a screen for selecting a file path is displayed. When a license file is designated in the same manner as that for bundle designation, a path to the license file is input to a path 532 to the license file. When an INSTALL button 535 is pressed, the installation of the bundle designated on the bundle file path 531 is started. When a fragment bundle is designated to install, the fragment bundle is once installed in an invalid status.

FIG. 6 illustrates a mechanism of the permission according to JAVA.

The policy of the JAVA application environment enables designation of an access right usable with a code from any one of various sources. A file enabling designation of an access right usable by a code is called a policy file 601.

It is assumed here that the policy file 601 designates the Java VM 207. The policy file 601 indicates that a jar file under/java_home/lib/ext/*" holds a permission, "java.io.FilePermission"/data/foo.dat" "read,write"".
The permission means that permissions for writing and reading is given to a file of /log/foo.dat.

Therefore, referring to FIG. 6, Sample 1.jar 603 and Sample 2.jar 604 under /java_home/lib/ext/602 have the permission. On the other hand, Sample 3.jar 606 under /java_home/etc 605 does not have the permission.

The Java VM 207 refers to the default policy file 601 when an API requests an authorization check. With reference to the permission held by the invoking bundle and the permission requested to be checked by the API, a determination is made whether the invoking bundle holds the permission or not. If it does not hold the permission, the API is not usable. Thus, the processing is aborted, and an error is returned.

A case will be examined, for example, in which an API is used which newly generates a file called java.io.File.createNewFile 600 in a JAVA default library from a certain jar to generate a file "/data/foo.dat". The API called a createNewFile 600 is configured to only enable a bundle having a write permission to the designated path to perform write processing. Thus, for calls (610,611) from Sample 1.jar 603 and Sample 2.jar 604 having the read/write permission for the file, no error is returned. On the other hand, for a call (612) from Sample 3.jar 606, an error is returned because the bundle does not have the write permission.

FIG. 7 illustrates a mechanism of an OSGi permission.

Based on the JAVA permission management mechanism illustrated in FIG. 6, it is configured that a permission held by a calling bundle referred by the Java VM 207 is managed by the OSGi extension unit 211.

The OSGi extension unit 211 manages a permission held by each bundle in a permission list 705 on memory. The Java VM 207 refers to the permission list 705 to obtain a type of a permission held by the calling bundle.

A default policy file 700 indicates a jar file under/java_home/lib/ext/*" holds three permissions. It should be noted that the default policy file is a permission commonly given to all bundles.

Bundle 1 jar 702 under/java/bundles/701 holds a permission definition file 704. On the other hand, it is assumed that Bundle 2.jar 703 does not hold a bundle definition file. The Bundle 1 jar 702 operates according to a permission acquired by adding a permission in the permission definition file to a permission in the default policy file. Because the Bundle 2.jar 703 does not hold a bundle definition file, the Bundle 2.jar 703 operates according to the permission in the default policy file.

Next, the permission definition file held by a bundle will be described with reference to FIGS. 8A and 8B.

Figure 8A:
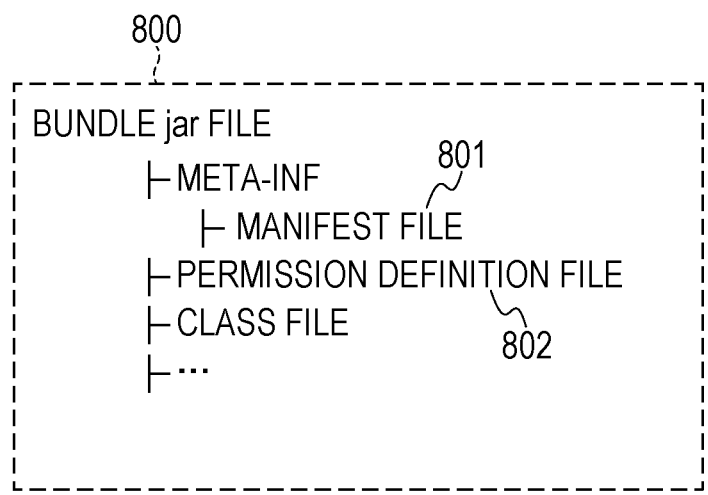
FIGS. 8A and 8B illustrate a permission definition file held in a bundle.

FIG. 8A illustrates a permission definition file held in a bundle. A bundle jar file 800 can hold a permission definition file 802 as well as a manifest file 801.

Figure 8B:
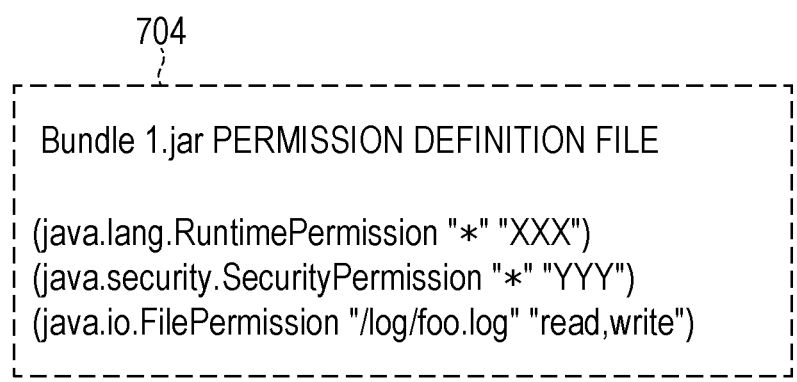

FIG. 8B illustrates the permission definition file 704 in the Bundle 1 jar 702. More specifically, three permissions of (java.lang.RuntimePermission "*" "XXX")(java.security.SecurityPermission "*" "YYY") (java.io.FilePermission "/log/foo.log" "read,write")
are defined.

Figure 10A:
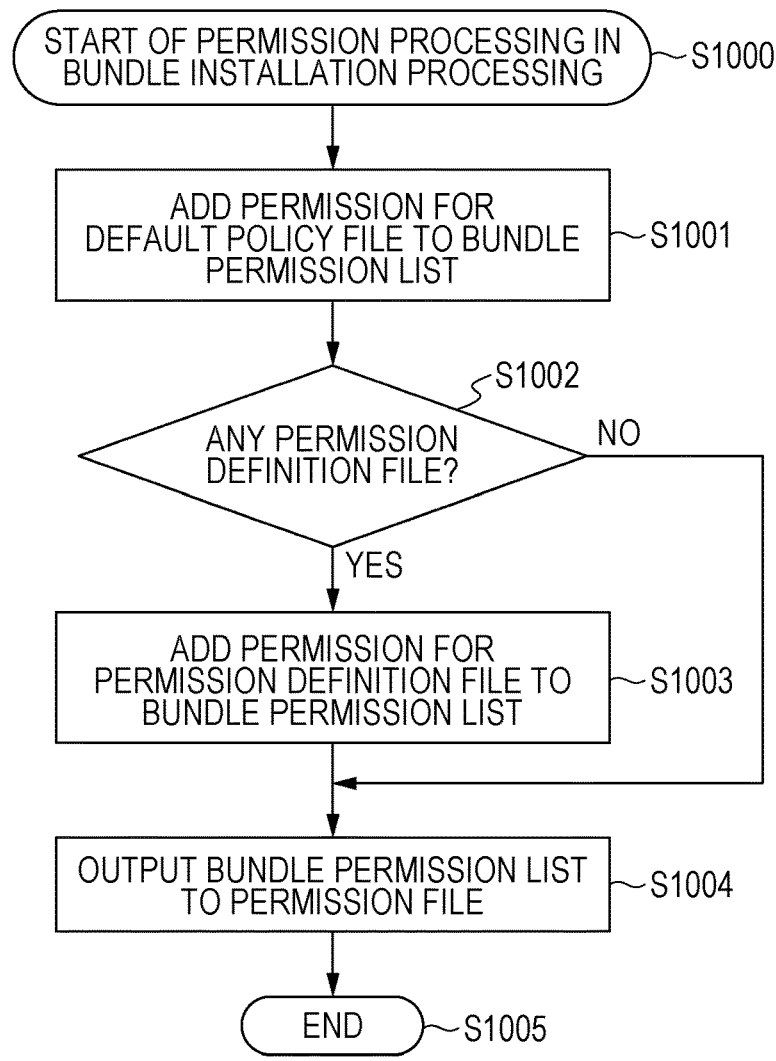
FIGS. 10A and 10B are flowcharts regarding a permission in the OSGi extension unit when a bundle is installed and when the image forming apparatus is started up.
Figure 10B:
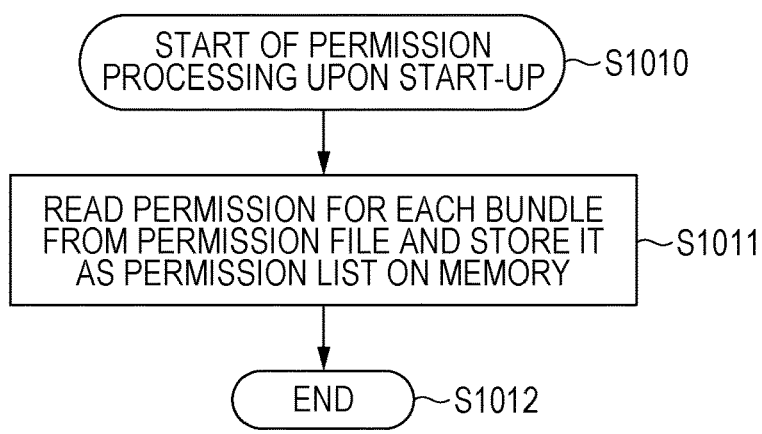

Referring back to FIG. 7, a permission held in the Bundle 1.jar 702 will be described. The OSGi extension unit 211 manages a result of an addition of the default policy file 700 and the bundle definition file 704 as the permission list 705 on memory when a bundle is first installed. Statuses of the permission list 705 in this case will be described with reference to FIG. 9. FIGS. 10A and 10B illustrate a flow for generating a bundle list 705 by the OSGi extension unit 211.

FIG. 9 illustrates permission lists 900 and 901 held on memory of the RAM 103 by the OSGi extension unit and a permission file 902 output from the OSGi extension unit to the HDD 104.

The permission 900 of the Bundle 1.jar 702 is a result of an addition of the permission 910 of the default policy file 700 and the permission 911 of the bundle definition file 704.

The permission 901 of the Bundle 2.jar 703 corresponds to the permission 910 of the default policy file 700 only.

The contents of the permission lists 900 and 901 held for each bundle are collectively output to the permission file 902. The permission file 902 receives permissions of all bundles installed in the image forming apparatus bindle by bundle. The Bundle 1.jar 702 holds a permission 920 and has the same content as that of the permission list 900. A Bundle ID 921 is a unique ID assigned to the Bundle 1.jar 702. The Bundle 2.jar 703 holds a permission 922 having the same content as that of the permission list 901. The Bundle ID 923 is a unique ID assigned to the Bundle 2.jar 703.

FIG. 10A is a flowchart for generating a bundle list 705 by the OSGi extension unit 211 when a bundle is installed. The term "bundle" illustrated in FIG. 10A corresponds to a host bundle excluding a fragment bundle.

In S1000, permission processing in bundle installation processing starts. Here, a bundle is installed from the bundle install user interface (or bundle install UI) 302 as illustrated in FIG. 3.

In S1001, the default policy file 700 is read, and a default permission written therein is added to a bundle permission list.

In S1002, whether a bundle to be installed holds a permission definition file is checked. If so, the processing moves to S1003. If not, the processing moves to S1004.

In S1003, a permission in the permission definition file 704 is read, and the permission written therein is added to the bundle permission list to update. It should be noted that a permission written in the permission definition file of a host bundle and is already included in the permission list is not added for prevention of overlapping.

In S1004, the bundle permission list is output as a permission file 902.

In S1005, the permission processing upon installation ends.

FIG. 10B illustrates how the permission file output in S1005 is to be used upon start-up of the image forming apparatus.

In S1010, permission processing by the OSGi extension unit 211 is started upon start-up of the image forming apparatus.

In S1011, a permission list is generated for each bundle based on a bundle ID 921 from the permission file 902. Referring to FIG. 9, the permission list 900 in Bundle 1.jar is generated from the permission 920 in Bundle 1.jar 702, The permission list 901 in Bundle 2.jar is generated from the permission 922 in Bundle 2.jar 703.

In S1012, the permission processing upon start-up ends.

Thus, after the start-up, permission lists of bundles are decompressed on memory and can be referred when the Java VM 207 inquires about a permission held in a bundle.

Figure 11:
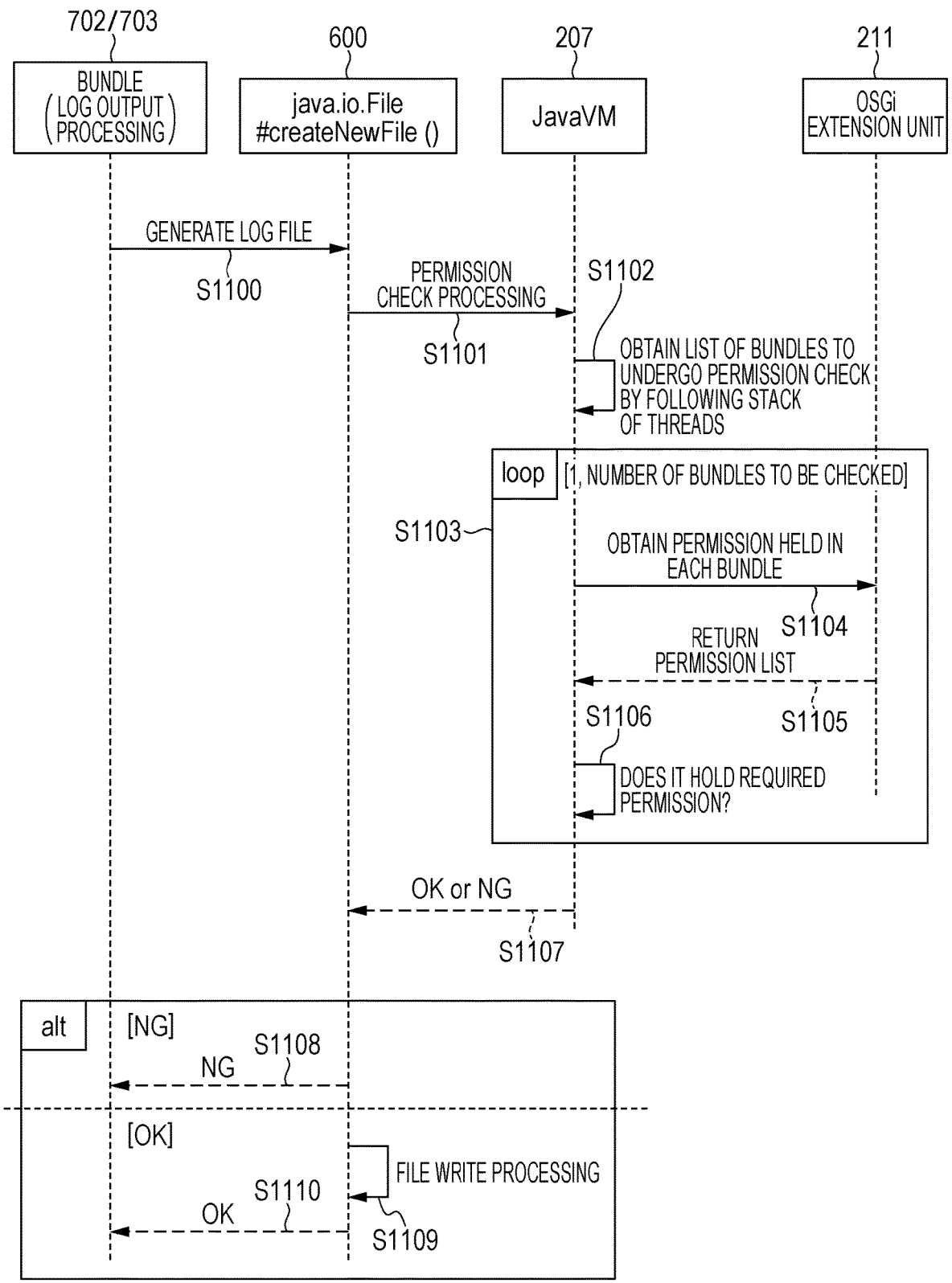
FIG. 11 is a sequence diagram regarding permission processing in an API called from a bundle.

FIG. 11 is a sequence diagram relating to permission processing when the createNewFile 600 is invoked from the Bundle 1.jar 702 and Bundle 2.jar 703 illustrated in FIG. 7.

The bundle (in a case where Bundle 1.jar 702 or Bundle 2.jar 703 is invoked, for example) outputs a log to "/log/foo.log" by using the createNewFile 600 in S1100. Although a bundle configured to perform log output processing will be described as an example, any other bundles configured to perform other kinds of processing may be applied. The processing in S1101 to S1105, S1106, and S1108 are performed on any bundles in the same manner. An example will be described with reference to a bundle excluding a fragment bundle, that is, a bundle corresponding to a host bundle. However, the same permission processing is to be performed even on a bundle including a fragment bundle, that is, a bundle including a host bundle and a fragment bundle.

The createNewFile 600 in S1101 performs a permission check. In this case, the createNewFile 600 inquires the Java VM 207 about whether the calling source holds a required permission. The Java VM 207 in S1102 goes back into a stack of the current thread and obtains a bundle ID list of the bundle to be checked for the permission. Here, the bundle to be checked is a bundle holding a class loaded by this processing. According to this example, the bundle to be checked is one bundle of Bundle 1.jar 702 or Bundle 2.jar 703. However, when Bundle 1.jar 702 or Bundle 2.jar 703 is called from another bundle, the calling bundle is also included. Next, in S1103, the Java VM 207 performs the permission check on all bundles on the list obtained in S1102. The Java VM 207 in S1104 inquires the OSGi extension unit 211 about the permission held by the bundle based on the bundle ID. The OSGi extension unit 211 in S1105 returns the permission list of the bundle (Bundle 1.jar 702 or Bundle 2.jar 70) inquired by the Java VM 207. The Java VM 207 in S1106 determines whether the permission required by the createNewFile 600 includes the permission list returned from the OSGi extension unit 211. In S1103, the check is performed on all of the bundles.

As a result of the processing in S1103, if the required permission is included in all of the bundles, the Java VM 207 returns an OK value in S1107. On the other hand, even one of the bundles has the permission, an NG value is returned.

If the returned value is NG, the createNewFile 600 returns an NG value to the bundle in S1108. On the other hand, if the OK value is returned, the createNewFile 600 executes a file create processing in S1109. After that, in S1110, the returned OK value is returned to the bundle.

If the bundle is Bundle 1.jar 702, it means that it includes a write permission to /log/foo.log,
(java.io.FilePermission "/log/foo.log" "read,write").
Therefore, it is determined that OK for permission-hold in S1107. Then, a file is created.

On the other hand, if the bundle is Bundle 2.jar 703, the write permission to /log/foo.log is not included. Thus, it is determined NG for the permission-hold in S1107.
Therefore, the file generation fails.

Up to this point, the operations relating to a permission of a bundle managed according to OSGi has been described. Furthermore, the operation to be performed when a fragment bundle being a function of OSGi is included has been described.

Figure 12:
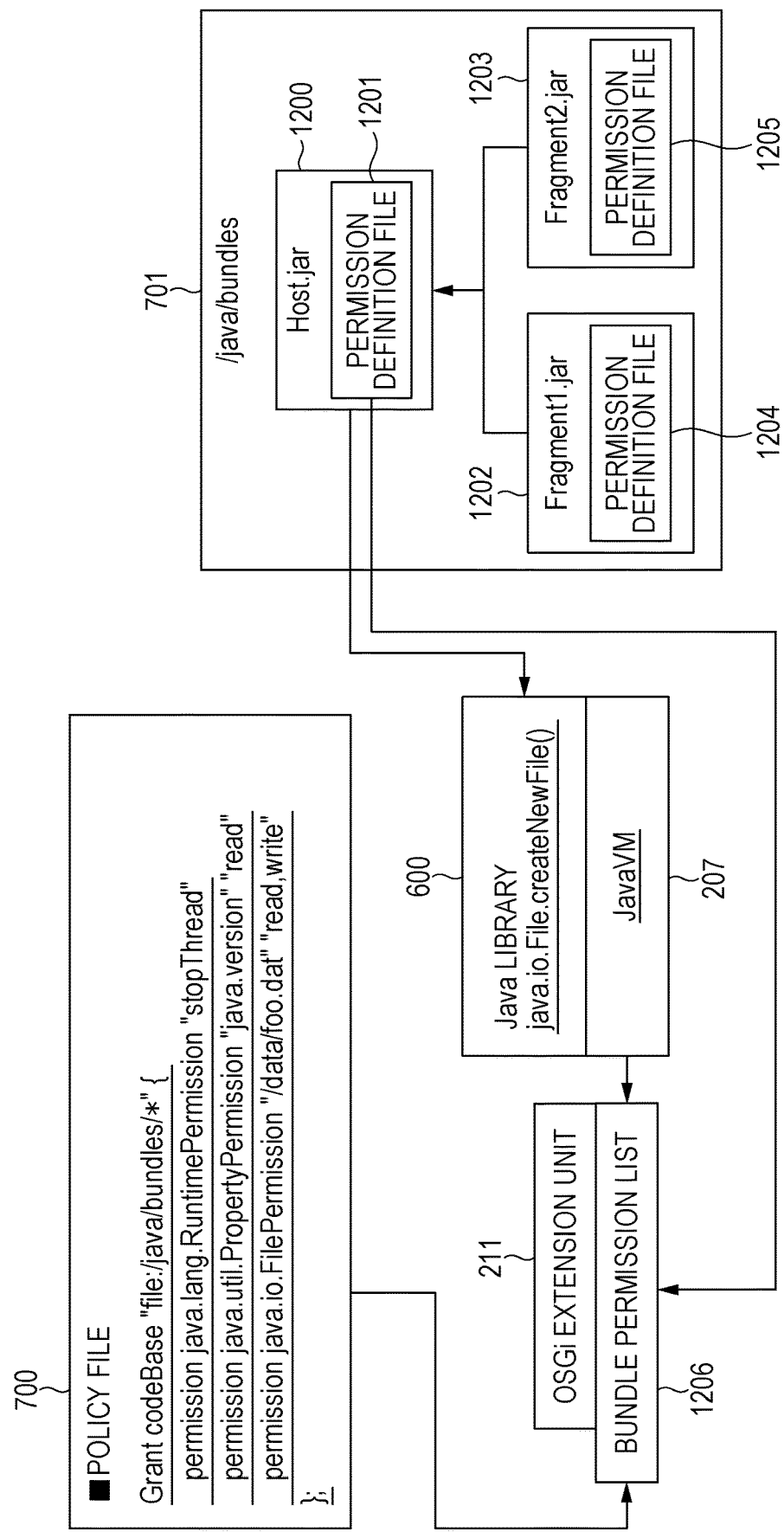
FIG. 12 illustrates a permission mechanism for a host bundle and a fragment bundle in OSGi.

FIG. 12 illustrates a mechanism of permissions for a host bundle and a fragment bundle according to OSGi.

Because the Java VM 207, the createNewFile 600, the OSGi extension unit 211, and the policy file 700 play the same roles as those described with reference to FIG. 7, any repetitive descriptions will be omitted.

Host.jar 1200 under /java/bundles/701 is a host bundle. Fragment 1.jar and Fragment 2.jar are fragment bundles of Host-jar 1200. Fragment 1.jar 1202 and Fragment 2.jar 1203 hold bundle definition files 1204 and 1205.

Next, a permission definition file held in each bundle will be described with reference to FIG. 13.

Figure 13:
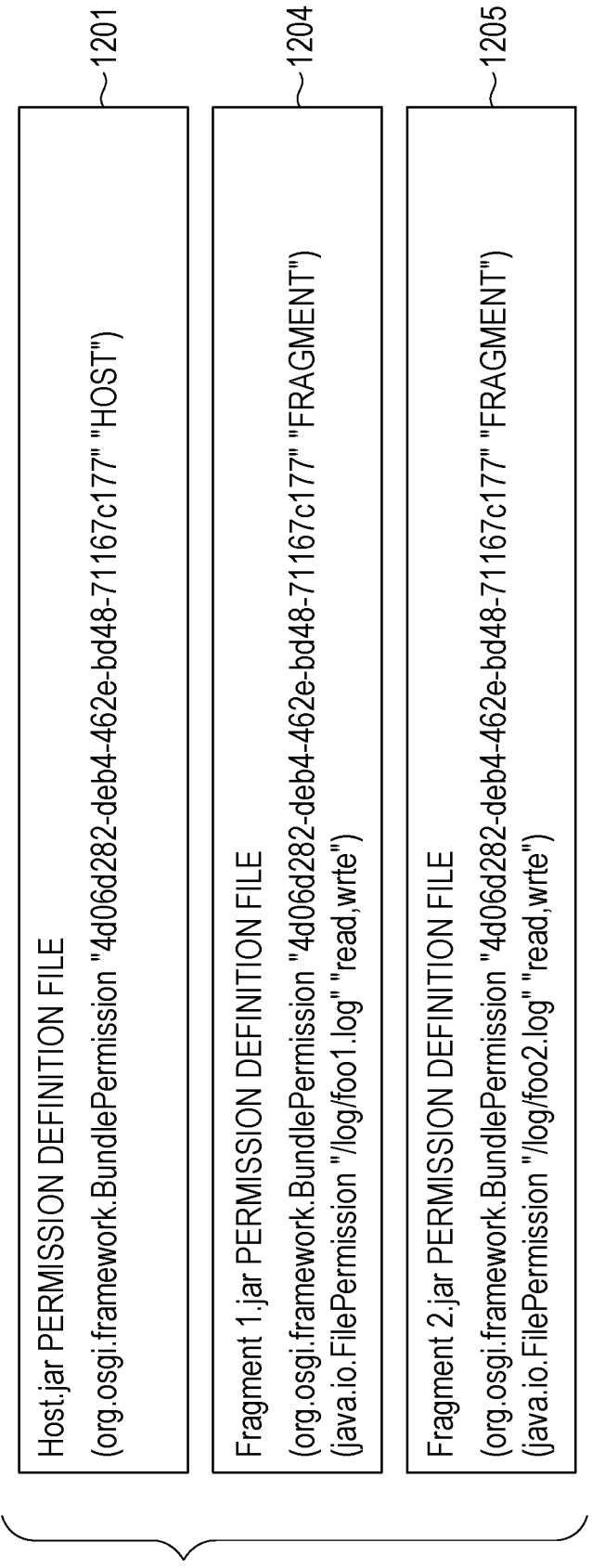
FIG. 13 illustrates permission definition files for a host bundle and a fragment bundle.

FIG. 13 illustrates the permission definition file held in each bundle. A permission definition file 1201 of Host.jar 1200 includes a description of:
(org.osgi.framework.BundlePermission "4d 06d 282-deb 4-462e-bd 48-71167c 177" "HOST")

A permission definition file 1204 of Fragment 1.jar 1202 describes two permissions of:
(org.osgi.framework.BundlePermission "4d 06d 282-deb 4-462e-bd 48-71167c 177" "FRAGMENT")
(java.io.FilePermission "/log/foo 1.log" "read,write")

A permission definition file 1205 of Fragment 2.jar 1203 describes two permissions of:
(ora.osgi.framework.BundlePermission "4d 06d 282-deb 4-462e-bd 48-71167c 177" "FRAGMENT")
(java.io.FilePermission "/log/foo 2zu.log" "read,write")

Referring back to FIG. 12, the Host.jar 1200 holds a permission. The OSGi extension unit 211 manages a permission list 1206 on memory which is acquired by adding the default policy file 700 and the bundle definition file 1201 upon first installation of the bundle. The status here is Status (1). When the Fragment 1.jar 1202 is attached to Host.jar 1200, the permission of the bundle definition file 1204 held in the Fragment 1 jar 1202 is added to the permission list 1206 for management. In the same manner, when the Fragment 2.jar 1203 is attached to Host.jar 1200, the permission of the bundle definition file 1205 held in the Fragment 2.jar 1203 is added to the permission list 1206 for management (where the status is Status (2)).

The state of the permission list 1206 in this case will be described with reference to FIG. 14. FIG. 15 illustrates a flow for generating a bundle list 1206 by the OSGi extension unit 211.

FIG. 14 illustrates changes of permission lists held in a host bundle when a fragment bundle is attached thereto.

The permission list 1400 indicates permissions having Status (1).

The permission list 1401 indicates permissions having Status (2). A permission 1410 is the permission described in the permission definition files 1204 and 1205 held in Fragment 1.jar 1202 and Fragment 2.jar 1203. However, any overlapped and identical permissions are not included in the lists in an overlapping manner.

The content of the permission list 1401 held in the host bundle is output to a permission file 1402. The permission file 1402 receives permissions of all bundles installed in the image forming apparatus bundle by bundle. A permission 1420 is held by Host.jar 1200 and has the same content as the permission list 1401. BundleID 1421 is a unique ID assigned to Host.jar 1200.

Figure 15A:
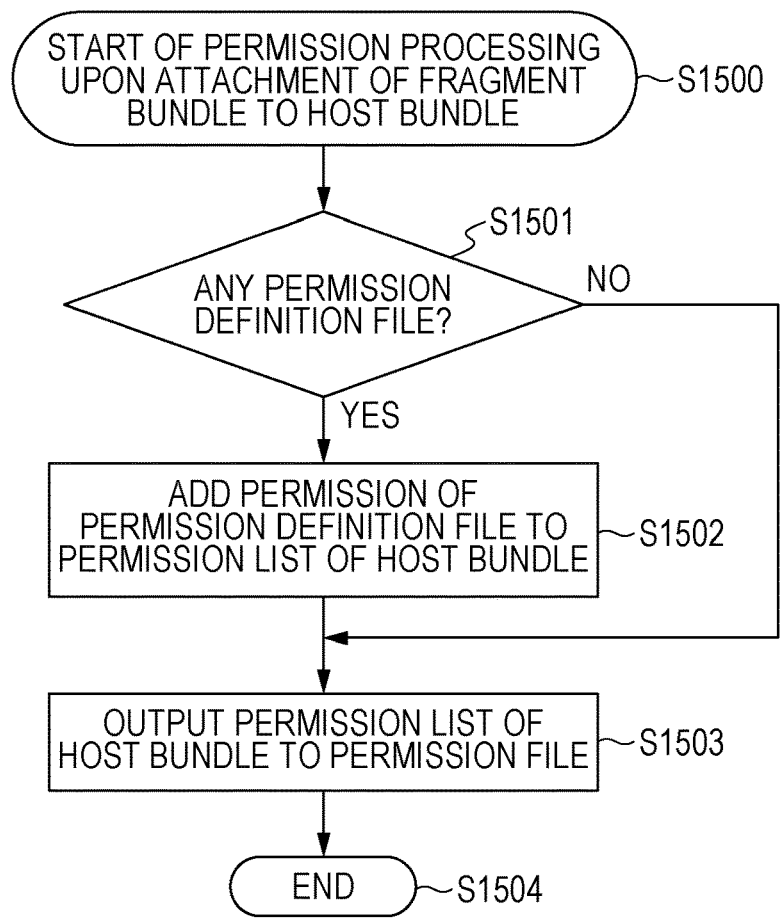
FIGS. 15A and 15B are flowcharts illustrating permission processing to be performed on a host bundle in the OSGi extension unit when a fragment bundle is attached to the host bundle.

FIG. 15A is a flowchart illustrating permission processing to be performed by the OSGi extension unit 211 when a fragment bundle is attached to a host bundle.

In S1500, the processing for attaching a fragment bundle to the host bundle starts. Here, a VALIDATE button 515 as illustrated in FIG. 5 may be pressed to attach a fragment bundle to the host bundle.

In S1501, a determination is made whether the fragment bundle to be attached holds a permission definition file. If so, the processing moves to S1502. If not, the processing moves to S1503.

In S1502, the permission in the permission definition file 1204/1205 is read, and the written permission is added to the permission list 1206 of the bundle. However, if the permission list 1206 has the same permission in an overlapping manner, the permission is not added to the list in an overlapping manner.

In S1503, the permission list of the bundle is defined and output as the permission file 1402.

In S1504, the processing for a permission to be performed when a fragment bundle is attached ends.

Figure 15B:
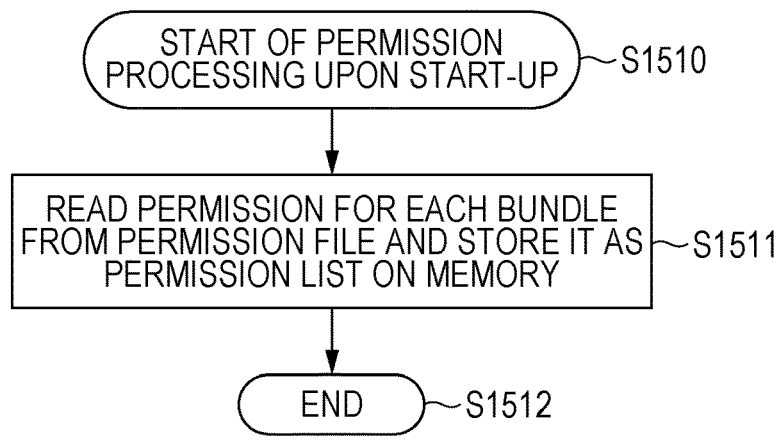

Next, FIG. 15B illustrates how a permission file 1403 output in S1503 is to be used when the image forming apparatus is started.

In S1510, the processing starts for a permission in the host bundle by the OSGi extension unit 211 upon start-up of the image forming apparatus.

In S1511, a permission list for each bundle is generated based on the bundle ID 1421 from the permission file 1402. Referring to FIG. 14, the permission list 1401 of Host.jar is generated based on the permission 1420 in Host.jar 1200.

In S1512, the processing for a permission upon start-up ends.

Thus, after start-up, a content of the permission definition file held in the fragment bundle is decompressed in the permission list 1206 of the host bundle on memory. Thus, the content can be referred when the permission held by the bundle is inquired from the Java VM 207.

The sequence diagram relating to the permission processing when a bundle including a fragment bundle is called is the same as the processing in FIG. 11. The bundle 702/703 in FIG. 11 corresponds to a bundle including a fragment bundle and a host bundle.

As described above, a content of the permission definition file held in a fragment bundle is added to the permission list of the host bundle when the fragment bundle is attached. Thus the mechanism similar to a general bundle can provide an effect that enables a permission required for a fragment bundle to be used.

Next, permission processing by the OSGi extension unit will be described for conversely detaching (deleting) a fragment bundle attached to a host bundle from the host bundle.

Figure 16:
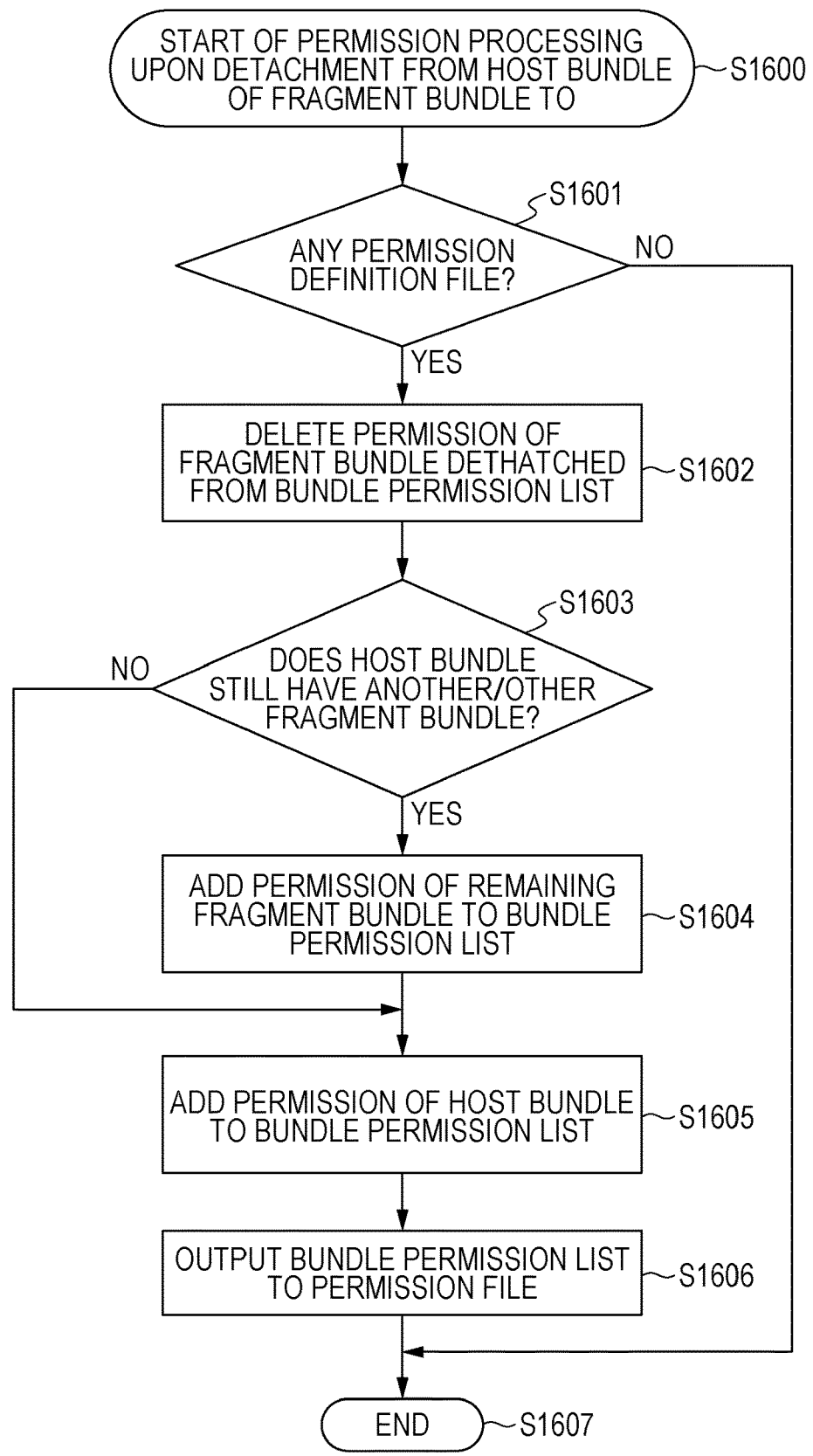
FIG. 16 is a flowchart illustrating permission processing for a host bundle in the OSGi extension unit when a fragment bundle is detached from the host bundle.

FIG. 16 is a flowchart illustrating permission processing to be performed on a host bundle by the OSGi extension unit 211 for detaching a fragment bundle from the host bundle.

More specifically, referring to FIG. 12, Fragment 1.jar 1202 is to be detached from a state that Fragment 1.jar 1202 and Fragment 2.jar 1203 are attached to Host.jar 1200.

In S1600, processing for detaching a fragment bundle from the host bundle starts. Here, the INVALIDATE button 514 as illustrated in FIG. 5 may be pressed to detach a fragment bundle from the host bundle.

In S1601, a determination is made whether the fragment bundle to be detached holds a permission definition file. If so, the processing moves to S1602. If not, the processing moves to S1607.

In S1602, the permission of the permission definition file 1204 is read, and the written permission is deleted from the permission list 1206 of the bundle.

In S1603, a determination is made whether any fragment bundle associated with the detached host bundle remains. If so, the processing moves to S1604. If not, the processing moves to S1605.

In S1604, a permission definition file of a remaining fragment bundle is read, and the written permission is added to the permission list 1206 of the bundle. It should be noted that a permission written in the permission definition file of a fragment bundle but is already included in the permission list is not added without overlapping.

Describing a specific example, the permission definition file 1205 of the remaining fragment bundle Fragment 2.jar 1203 is read, and the permission written therein is added to the permission list 1206 of the bundle. Although this is the permission overlapping in the permission definition file 1204 of the Fragment 1.jar 1202 (org.osgi.framework,BundlePermission "4d06d282-deb4-462e-bd48-71167c177" "FRAGMENT"), it is deleted in S1602 and is not added here again.

In S1605, the permission definition file of the host bundle is read, and the permission written therein is added to the permission list 1206 of the bundle. It should be noted that a permission written in the permission definition file of a host bundle and is already included in the permission list is not added for prevention of overlapping.

In S1606, the permission list of the bundle is output as the permission file 1402.

In S1607, the processing ends for a permission when a fragment idle is detached.

In S1604 and S1605, a permission already included in the permission list is not added without overlapping. However, after a permission written in a permission definition file of a fragment bundle and a permission written in a permission definition file of the host bundle are added, the overlapping permission may be deleted.

Figure 17:
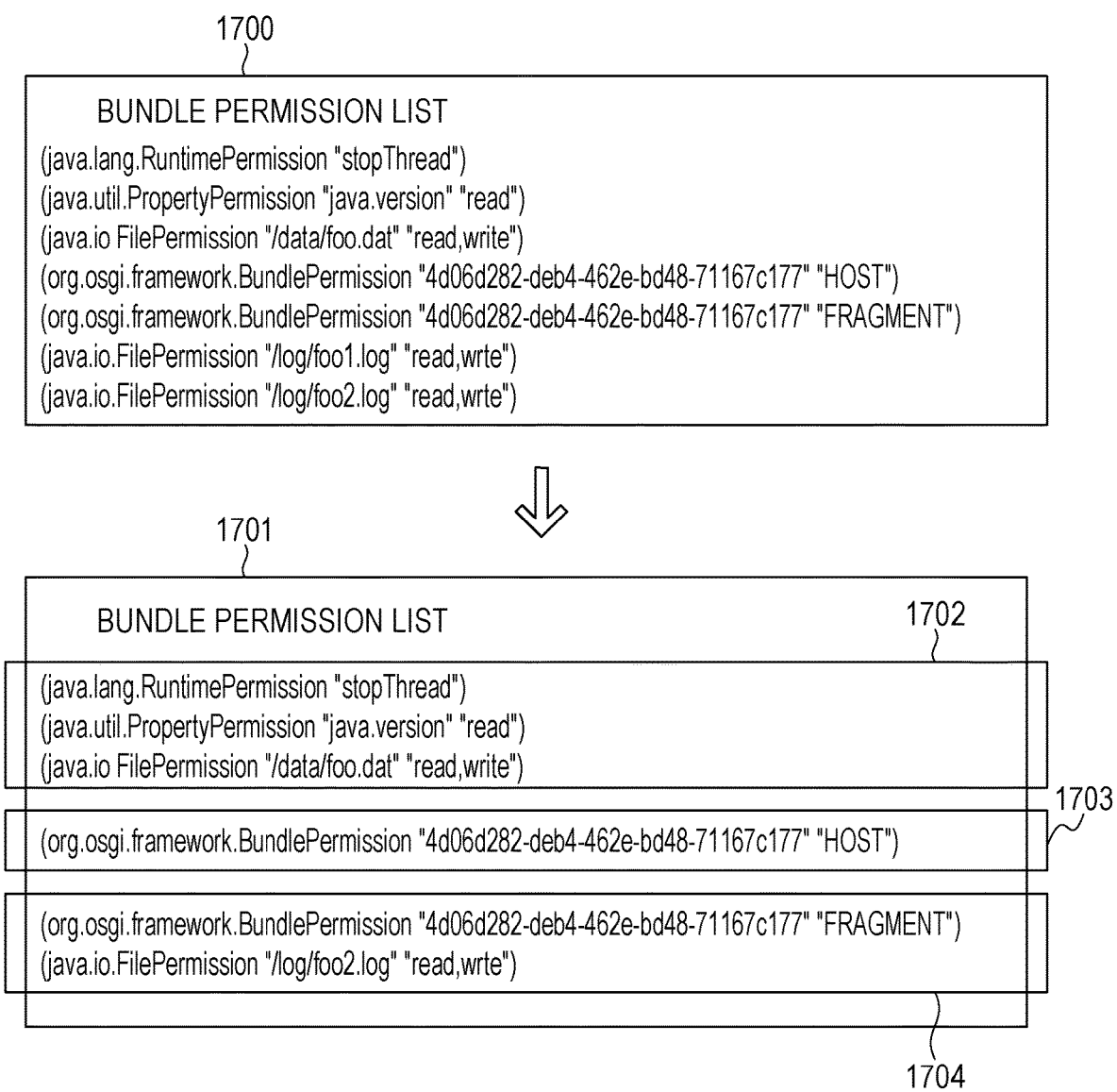
FIG. 17 illustrates changes of a permission list held in a host bundle when a fragment bundle is detached.

FIG. 17 illustrates a change of a permission list held in a host bundle when a fragment bundle is detached.

A permission list 1700 of the host bundle has the same state as the permission list 1401 when Fragment 1.jar 1202 and Fragment 2.jar 1203 are attached to Host.jar 1200.

When Fragment 1.jar 1202 is detached from the state, a permission 1701 is finally added to the permission list 1206 of the host bundle. FIG. 17 illustrates a permission 1702 of a default policy, a permission 1703 defined in Host.jar, and a permission 1704 defined in Fragment 2.jar 1203.

When a fragment bundle is detached, a content of a permission definition file held in the fragment bundle detached from the permission list of the host bundle is deleted, as described above. Thus, a content of the permission list of the host bundle is updated to a state still having a required permission, which is advantageously a desirable state for security.

According to this embodiment, as described above, the life cycle of attachment and detachment of a fragment bundle and the life cycle of addition and deletion of a permission are synchronized. Thus, a required number of permissions for fragment bundles can be used as required.

The host bundle itself may hold a required number of permissions.

The advantages of this embodiment will specifically be described below.

A bundle having a strong permission such as an administrator authorization can have a bad influence within the image forming apparatus. An authorization more than necessary may not be given to an app for security reason in general. Accordingly, it may be recommended that a permission held in a host bundle has necessary and sufficient permissions within a scope of implementation of the host bundle.

On the other hand, a fragment bundle is to be used for adding or replacing a function of a host bundle. Apparently, the necessary permission may vary therefor. In this case, the function added or replaced by the fragment bundle performs processing based on a permission defined in the host bundle. Accordingly, a permission fragment required for a bundle may hold in advance a permission meaning that all permissions called java.security.AllPermission in the host bundle. However, this is against the recommendation rule that a bundle should have a necessary minimum permission.

Definition of a permission to be held in a host bundle may be considered as well as the addition of a fragment bundle. However, the host bundle is generated again based on the fragment bundle, which may result in a loss of a feature of the fragment bundle having an extendable function within the fragment bundle.

Against the problems, this embodiment can provide the mechanism for properly managing permissions in accordance with attachment and detachment of fragment bundles to and from a host bundle.

The aforementioned embodiment can provide a technology that makes a permission definition file held in a host bundle to be executable without correcting it and without lack necessary permissions for processing to be performed by fragment bundles.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-191762 filed Sep. 29, 2017, which is hereby incorporated by reference herein in its entirety.

What is claimed is:

1. An image forming apparatus comprising:
   at least one processor and at least one memory coupled to each other and cooperating to act as:
   a holding unit configured to hold a permission list for a host application associated with the host application;
   an addition unit configured to add a plug-in application for expanding a function of the host application to the host application;
   an update unit configured to add and update, in a case where a permission is included in the plug-in application, the permission included in the plug-in application to the permission list for the host application; and
   a determination unit configured to determine whether processing in the host application with the plug-in application added thereto is to be executed based on the updated permission list,
   wherein the plug-in application is not executed independently but executed in a state where the plug-in application is added to the host application.

2. The image forming apparatus according to claim 1, wherein the plug-in application holds a permission definition file including a permission for the plug-in application.

3. The image forming apparatus according to claim 1, wherein the permission list for the host application includes identification information for identifying the host application.

4. The image forming apparatus according to claim 1, further comprising:
   a first receiving unit configured to receive an instruction to add the plug-in application to the host application,
   wherein the addition unit adds the plug-in application to the host application based on an instruction received by the first receiving unit.

5. The image forming apparatus according to claim 1, further comprising a deletion unit configured to delete the plug-in application from the host application.

6. The image forming apparatus according to claim 5, further comprising a second receiving unit configured to receive an instruction to delete the plug-in application from the host application.

7. The image forming apparatus according to claim 6, wherein the deletion unit deletes the plug-in application from the host application based on an instruction received by the second receiving unit.

8. The image forming apparatus according to claim 6, further comprising a second deletion unit configured to delete a permission included in the plug-in application from the updated permission list based on an instruction received by the second receiving unit.

9. The image forming apparatus according to claim 8, wherein the second deletion unit deletes the permission included in the plug-in application from the updated permission list and adds a permission included in the host application.

10. A control method for an image forming apparatus, the control method comprising:
    adding a plug-in application for expanding a function of the host application to a host application;
    adding and updating, in a case where a permission is included in the plug-in application, the permission included in the plug-in application to a permission list for the host application associated with the host application; and
    determining whether processing in the host application with the plug-in application added thereto is to be executed based on the updated permission list, wherein the plug-in application is not executed independently but executed in a state where the plug-in application is added to the host application.

11. The control method for the image forming apparatus according to claim 10, wherein the plug-in application holds a permission definition file including a permission for the plug-in application.

12. The control method for the image forming apparatus according to claim 10, wherein the permission list for the host application includes identification information for identifying the host application.

* * * * *